(12) United States Patent
Lilja et al.

(10) Patent No.: US 6,805,734 B1
(45) Date of Patent: Oct. 19, 2004

(54) COMPACT CASCADE SCRUBBER FOR SCRUBBING EXHAUST GAS

(75) Inventors: Launo Lilja, Pori (FI); Pasi Määttä, Keminmaa (FI); Pekka Niemelä, Tornio (FI); Timo Nivala, Vantaa (FI); Bror Nyman, Ulvila (FI)

(73) Assignee: Outokumpu OYJ, Espoo (FI)

( * ) Notice: Subject to any disclaimer, the term of this patent is extended or adjusted under 35 U.S.C. 154(b) by 18 days.

(21) Appl. No.: 10/088,566
(22) PCT Filed: Sep. 29, 2000
(86) PCT No.: PCT/FI00/00834
§ 371 (c)(1), (2), (4) Date: Apr. 26, 2002
(87) PCT Pub. No.: WO01/23071
PCT Pub. Date: Apr. 5, 2001

(30) Foreign Application Priority Data

Sep. 30, 1999 (FI) .............................. 19992097

(51) Int. Cl.$^7$ .............................. B01D 47/00
(52) U.S. Cl. .............................. 96/273; 96/276; 96/278; 96/322; 96/349; 96/350
(58) Field of Search .................. 95/198, 199, 200, 95/201, 223, 226, 216, 217, 219; 96/271, 272, 273, 274, 275, 276, 277, 278, 280, 322, 323, 331, 348, 349, 350

(56) References Cited

U.S. PATENT DOCUMENTS

| | | | |
|---|---|---|---|
| 2,069,389 A | * | 2/1937 | Peebles |
| 2,687,780 A | | 8/1954 | Culhane |
| 3,199,267 A | * | 8/1965 | Hausberg |
| 3,745,745 A | * | 7/1973 | Mare |
| 3,827,216 A | * | 8/1974 | Mare |
| 3,881,898 A | * | 5/1975 | Darby et al. |
| 3,994,705 A | * | 11/1976 | Przewalski |
| 4,133,655 A | * | 1/1979 | De Cardenas |
| 5,178,653 A | | 1/1993 | Lilja et al. |

FOREIGN PATENT DOCUMENTS

| | | | |
|---|---|---|---|
| CH | 464863 | * | 12/1968 |
| SE | 179714 | * | 6/1962 |
| SE | 340333 | * | 11/1971 |

OTHER PUBLICATIONS

"Air Pollution Control Equipment", H. Brauer, Y.B.G. Varma, Springer–Verlag, Berlin Heidberg New York 1981, pp. 219–239.*

* cited by examiner

Primary Examiner—Duane S. Smith
(74) Attorney, Agent, or Firm—Smith-Hill and Bedell

(57) ABSTRACT

This invention relates to a cascade-type scrubber, with which the wet scrubbing of the exhaust gas and removal of droplets from the gas can be performed in one and the same scrubber, producing a pure, dropless gas. It is thus essential that the cascade tubing typical of the cascade scrubber and the equipment for droplet removal are combined into a single compact entity, which is formed of several nested chambers.

14 Claims, 8 Drawing Sheets

COMPACT CASCADE SCRUBBER FOR SCRUBBING EXHAUST GAS

Figure 1:
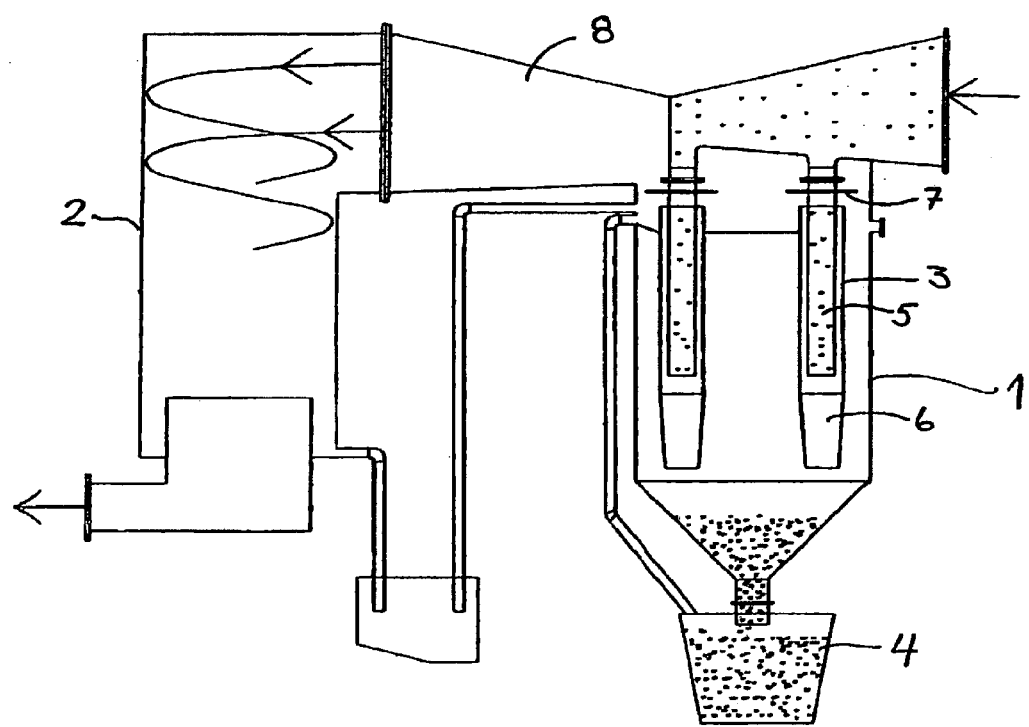

This invention relates to a cascade-type scrubber, with which the wet scrubbing of the exhaust gas and removal of droplets from the gas can be performed in one and the same scrubber, producing a pure, dropless gas. It is thus essential that the cascade tubing, typical of the cascade scrubber and the equipment for droplet removal are combined into a single compact entity, which is formed of several nested chambers.

Cleaning of gases can in principle be divided into two stages, the actual scrubbing and the subsequent droplet separation. One scrubber type used extremely often is the venturi scrubber and another is the cascade scrubber.

In a cascade scrubber (e.g. Bauart BAHCO), the gas to be scrubbed is sucked in reduced pressure into a series of cascade tubes. The gas is injected via the central cascade tube into the scrubbing liquid and sucked from there upward through an annular tube around the central tube. The gas, which has taken the liquid with it, is allowed to collide with a plate surrounding the central tube, which directs the gas downward again. Thus the "self-droplet formation" of the liquid is achieved, and as a result the final scrubbing of the gas occurs. Droplet separation takes place in a separate droplet separator.

Different types of droplet separators are described in the literature e.g. H. Brauer, Y. B. G. Varma: "Air Pollution Control Equipment", Springer-Verlag 1981. pp. 219–239. The main types of droplet separators are the zigzag channel, centrifugal or classic filter principles.

According to this invention a compact cascade scrubber is formed essentially of a cylindrical apparatus, where the gas scrubbing equipment is located in the outer section and the droplet separation equipment in the inner section. The gas scrubbing equipment is composed of several annular chambers as is the droplet separation equipment. The gas to be scrubbed comes into the outer circle of the upper section of the scrubber from one channel and the pure, dry gas is vented through one channel from the central section of the scrubber. The chamber located in the lower section of the outer circle of the scrubber contains several scrubbing units working on the cascade principle and around it and inside it are more annular chambers belonging to the scrubber. The essential features of the invention will become apparent in the attached claims.

The advantage of having several cascade scrubbing units is that changes in the volume of gas can be reacted to swiftly. In this case, when gas is distributed from a integrated gas space to several cascade tubes, it is extremely easy to shut off some of the tubes in order to optimize conditions in the cascade tubes when the volume of gas decreases. The corresponding capacity adjustment in the droplet separator can be made in the incoming tangential channels either by adjusting the surface area of the channels or by shutting off some of the channels completely. It is well known that separating capacity (centrifugal force) only improves when tangential intake velocity is increased.

In the embodiment of the invention all the gas is conducted first to a common chamber, from where it is divided into several scrubbing units. Naturally successful distribution depends on the construction of the distribution chamber. One distribution method, well known from air-conditioning technology, is changing the cross-section of the flow in the flow direction. A typical method is to use a sloping bottom in the annular distribution chamber. It is also advantageous for the droplet separator if the scrubber has only one discharge channel, in other words, the sub-flows of gas from the cascade tubes are combined after scrubbing at least twice. The first time is immediately after the scrubbing in the cascade tubes in the annular chamber situated below the gas distribution chamber. After combining the gas flows the gas is separated in the next annular chamber into sub-flows, which are then recombined to flow into the droplet separator.

Symmetry and the use of essentially cylindrical walls are typical of a scrubber according to this invention. This is significant especially for reasons of strength, because a reduced pressure is used in most scrubbers, and the above-mentioned properties prevent the collapse of the scrubber when using reduced pressure. The actual scrubbing occurs best in a reduced pressure—i.e. the gas can reach a suitable velocity with a blower located after the scrubber. It is clear that scrubbing also functions under pressure, but it is not beneficial for the blower to feed hot and dirty gas through it In the apparatus according to the present invention, the cascade scrubbing units are similar and placed symmetrically, thus aiming at optimal gas distribution. If some of the scrubbing units are shut, it is also beneficial to do this symmetrically. The scrubbed gas in the cascade tubes is conducted tangentially along several channels to the following inner, annular space, where the sub-flow of gas are combined.

The invention is described further in the attached drawings, where

Figure 2:
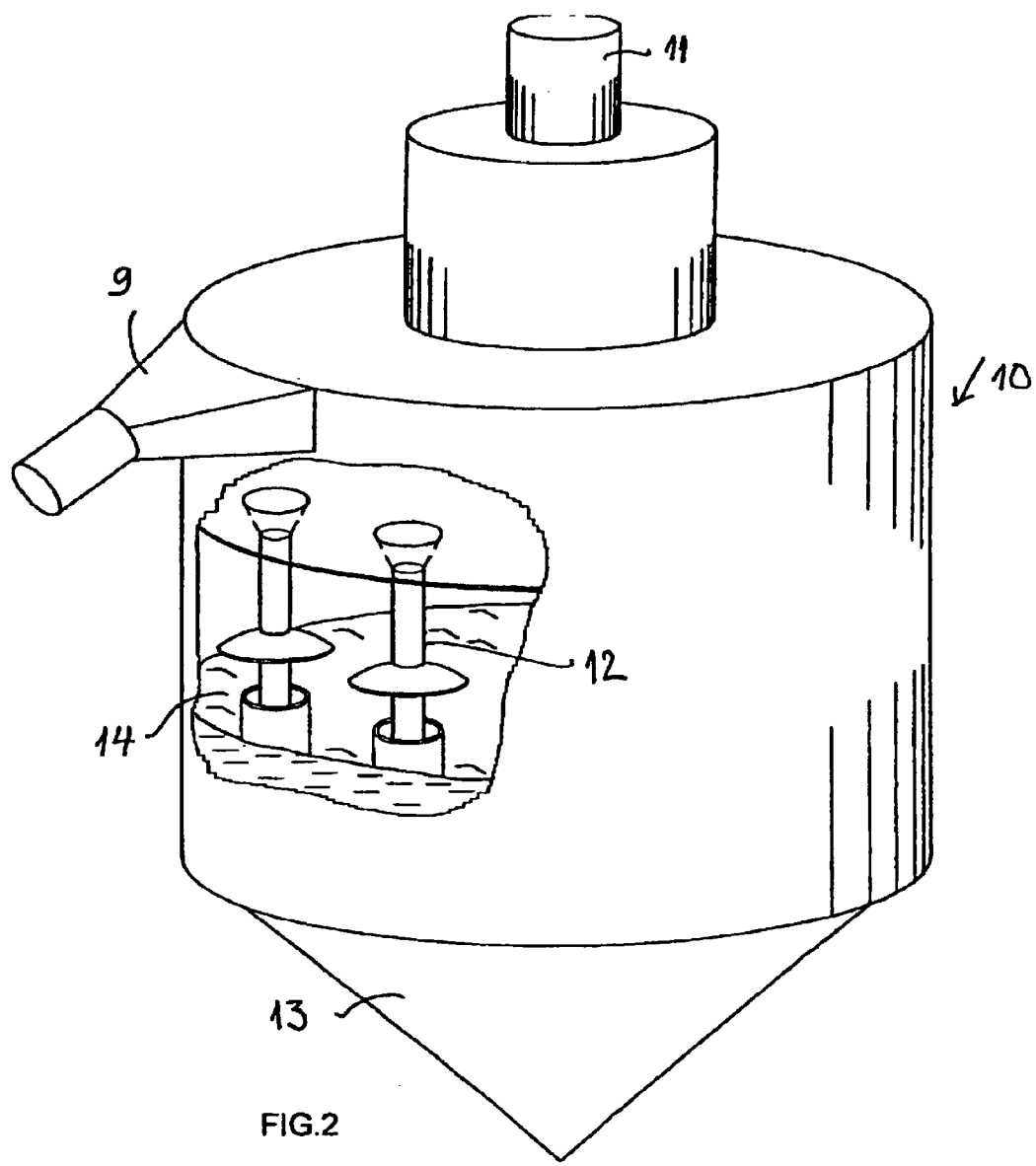
Figure 3A:
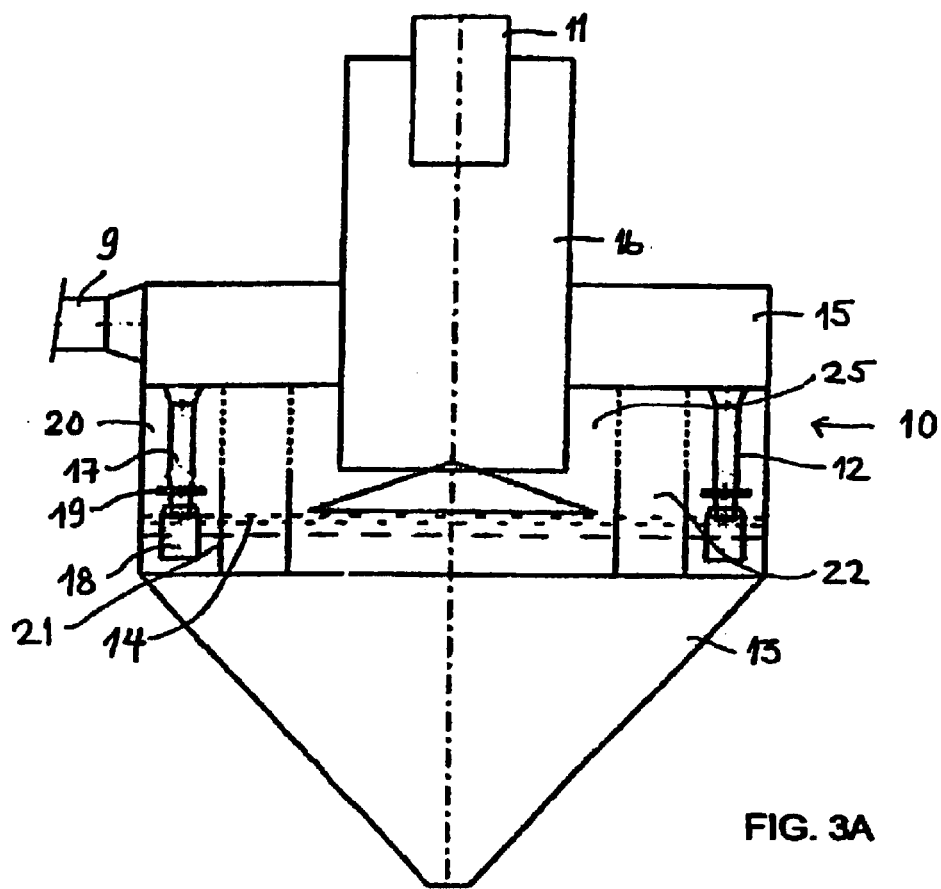
Figure 3B:
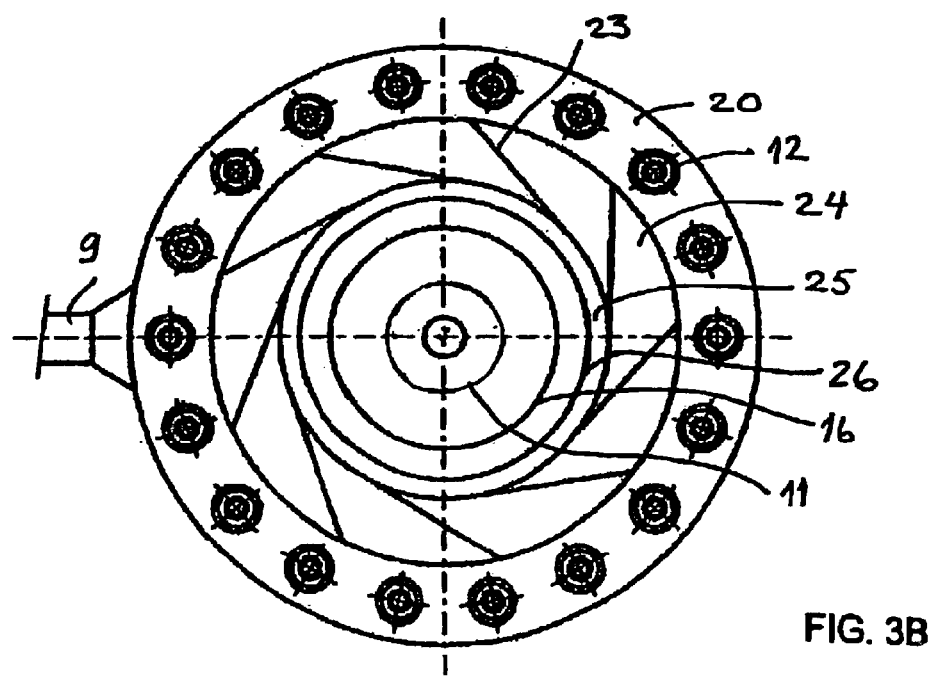
Figure 4:
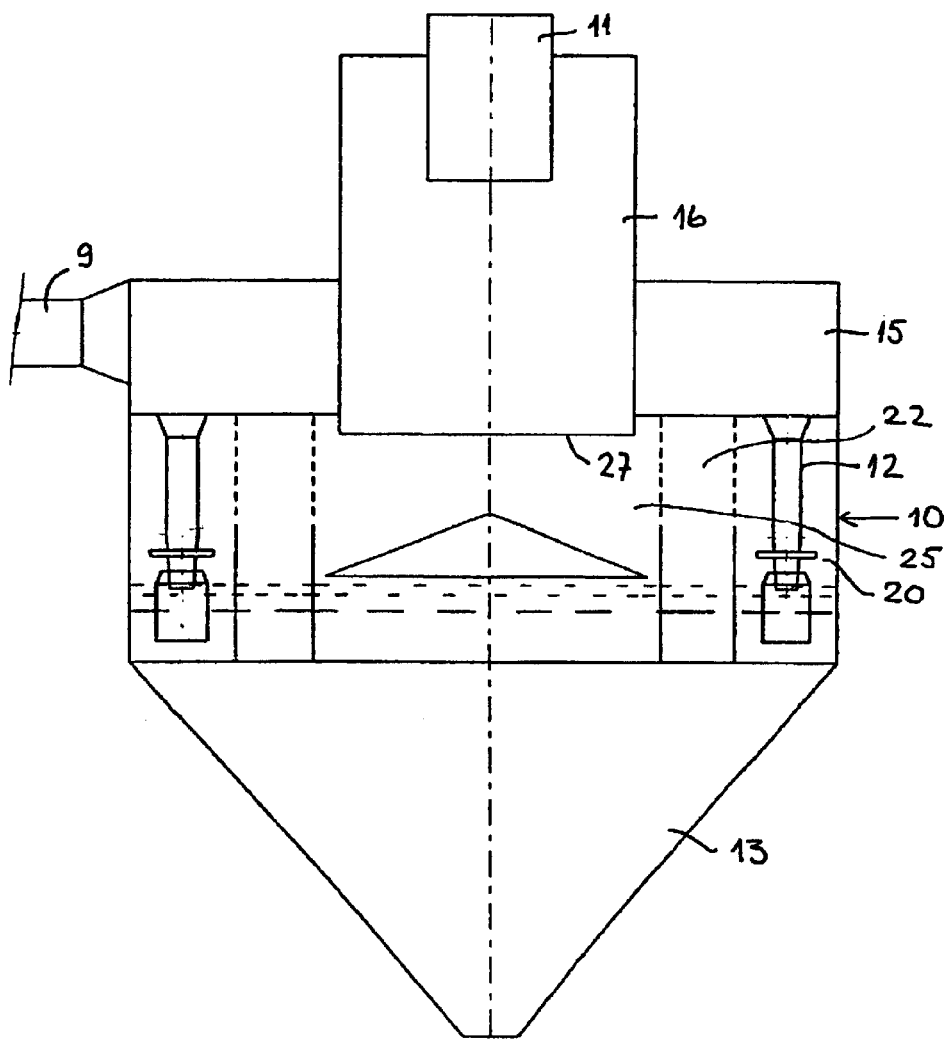
Figure 5A:
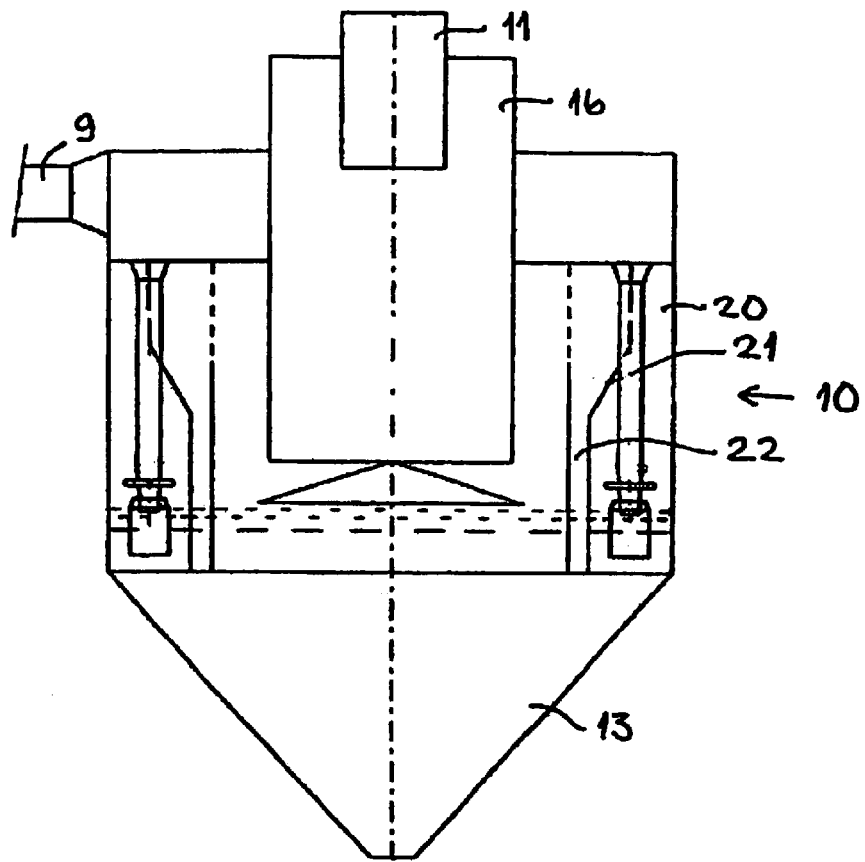
Figure 5B:
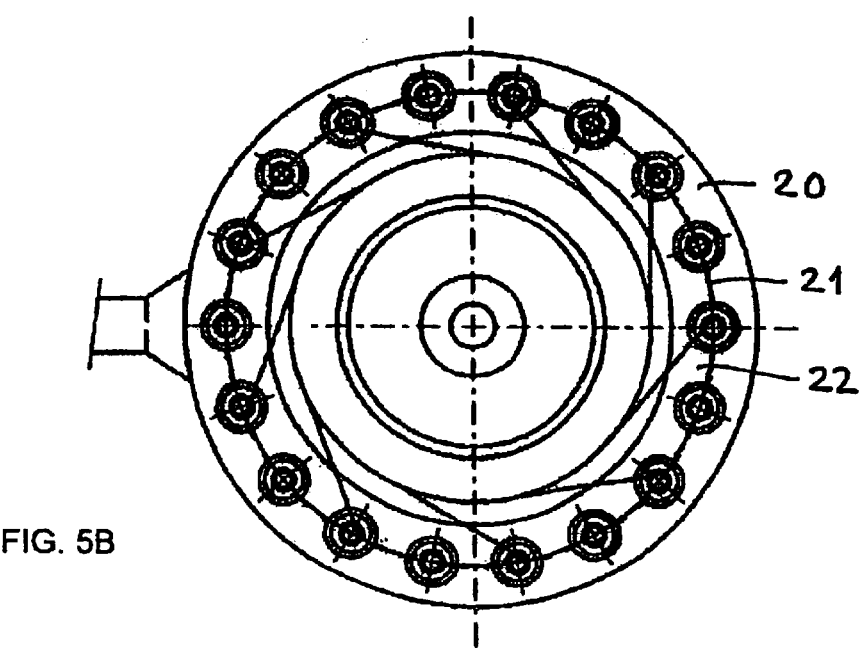
Figure 6:
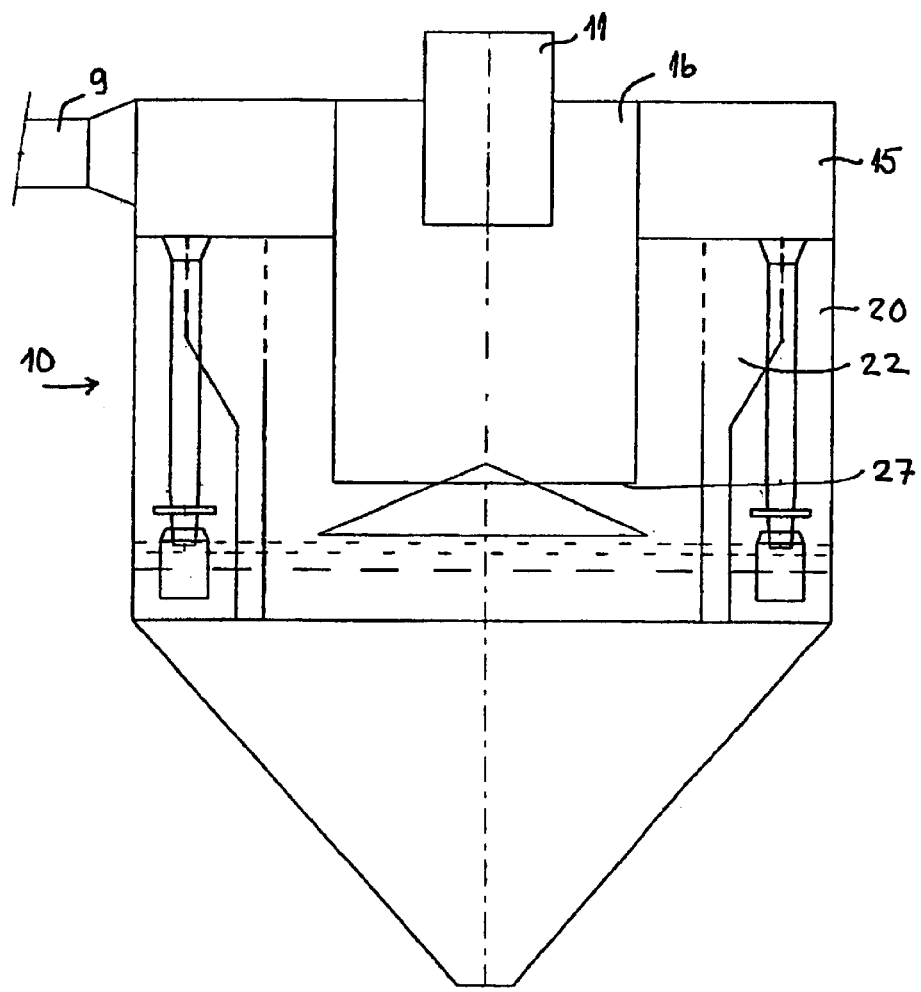
Figure 7:
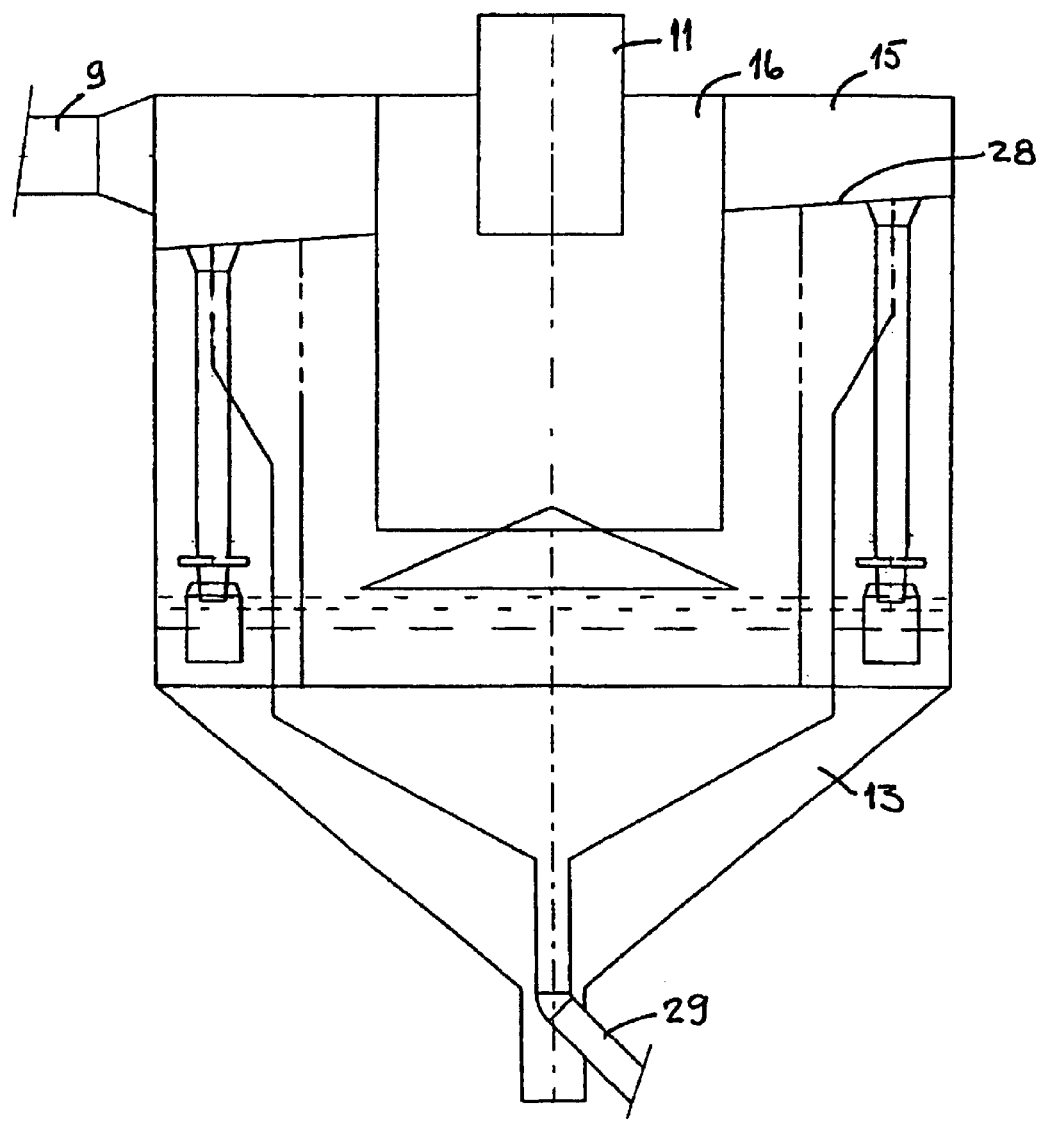
Figure 8:
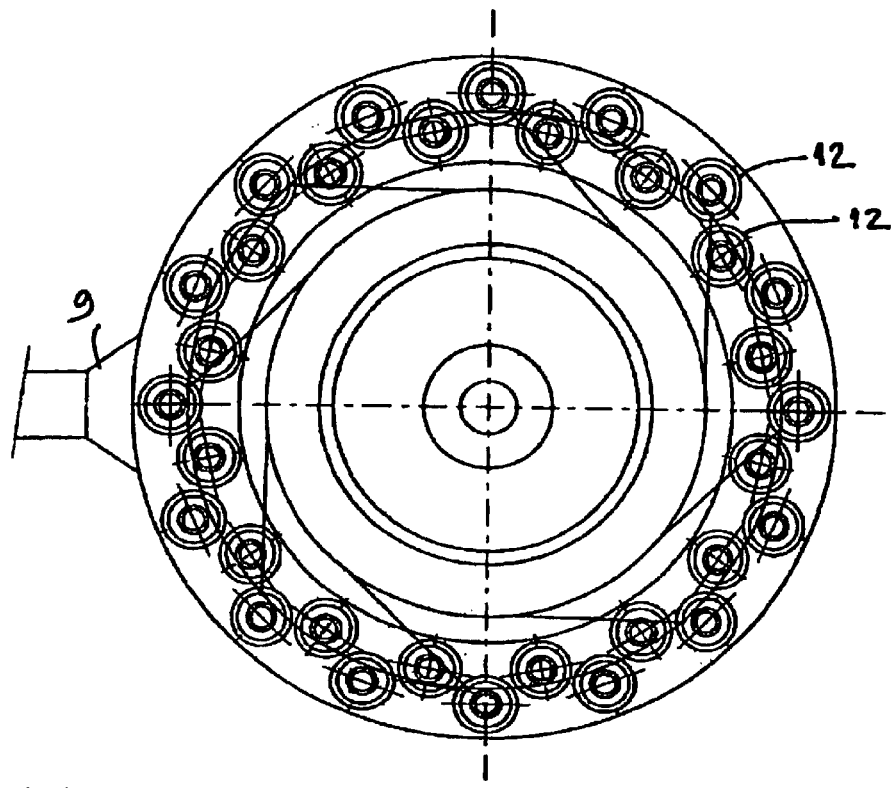
Figure 9:
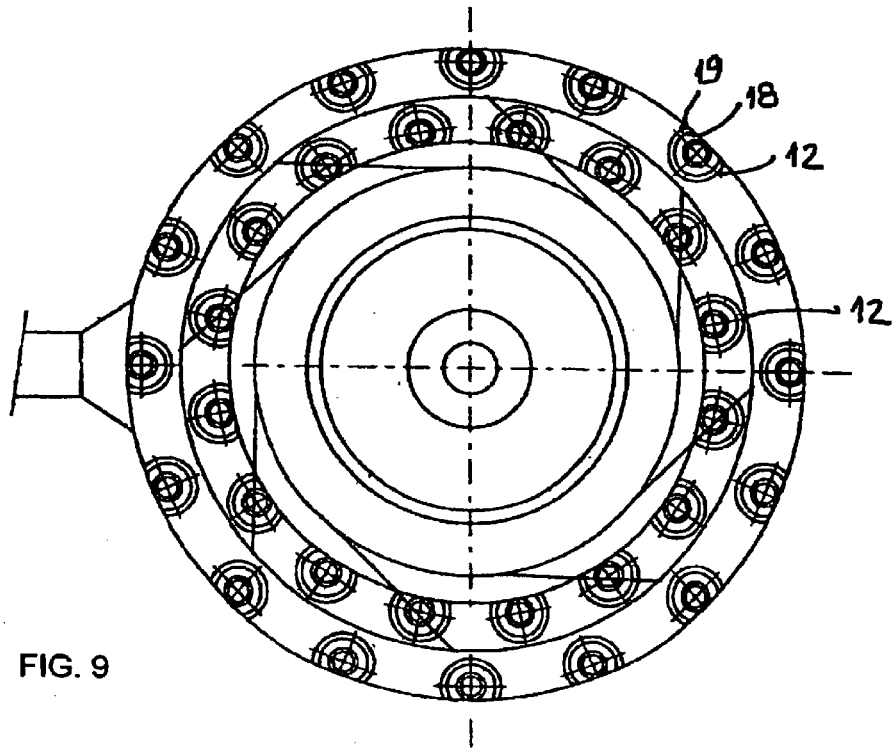

FIG. 1 presents cascade scrubbers of the prior art,

FIG. 2 presents the general principle of one embodiment of the invention in a partially cut drawing, FIG. 3A is a vertical section and FIG. 3B a cross-section of one scrubber according to the invention, FIG. 4 is a vertical section of another embodiment of the invention where the bottom of the droplet separator swirl chamber has been raised, FIGS. 5A and 5B are further vertical end cross-sections of a scrubber that has been modified to reduce its diameter, FIG. 6 shows a scrubber, where the upper cover of the droplet separator as been lowered, FIG. 7 shows a vertical cross-section of a scrubber according to the invention, where the bottom of the annular chamber has been shaped, FIG. 8 shows a cross-section of a scrubber where the cascade tubes are located in several circles, and FIG. 9 shows a cross-section where the cascade tubes have been shaped.

FIG. 1 presents an exhaust gas scrubbing apparatus of the prior art, comprising a scrubbing section 1 and a separate droplet separation unit 2. Several cascade tubes 3 are located inside the scrubber and the gas scrubbing water is discharged into a tank 4 in the lower section of the scrubber. A single cascade tube consists of an inner tube 5, an outer tube 6 around it and a collision plate 7 placed around the inner tube. The gas routed to the scrubber is conveyed into the inner tube 5 of the cascade tube and from there to the outer tube 6 around and under said tube where it can be injected into the water surface in the outer tube. The gas, partially scrubbed and carried away with droplets from the water, rises upwards inside the outer tube and comes into contact with a dish-like collision plate 7, which changes the direction of the gas downwards again. After colliding and bending, the direction of the gas once more turns outwards and the gas is vented through a connecting tube 8 from the scrubbing unit into the droplet separation unit, where the droplets attached gas during scrubbing are separated and the scrubbed gas is discharged from the unit.

The principle FIG. 2 of the scrubber according to the present invention shows that a scrubber 10 is essentially cylindrical in cross-section at the scrubber and droplet separator sections and conical at the bottom section. The gas to be scrubbed enters the scrubber via an inlet channel 9 and the scrubbed gas is vented via a droplet separator unit discharge tube 11 inside the scrubber. As the partially opened drawing shows, there are several cascade tubes 12 in the circle of the lower section of the scrubber. The surface 14 of the scrubbing water in the water tank 13 in the lower section of the scrubber reaches as far as the cascade tubes. The lower section of the scrubber is preferably conical, whereby the solids to be scrubbed from the gas are more easily removed with the scrubbing water. The figure also shows that the structure of the scrubber is cylindrical and compact and therefore easy to maintain.

The structure of the cascade scrubber according to the invention is shown in more detail in FIGS. 3A and 3B. The gas inlet channel 9 is connected to an annular gas distribution chamber 15 located around a droplet separation chamber 16 in the top of the scrubber 10. At its lower section the gas distribution chamber is connected to inner tubes 17 of the cascade tubes 12, into which the gas to be scrubbed is discharged from chamber 15. As mentioned in regard to the prior art, the cascade tubes consist in this case too of an inner tube, an outer tube 18 and a dish-like collision plate 19 attached to the inner tube. When the inner tube is positioned at such a height that its lower edge comes below the liquid surface 14, scrubbing efficiency is maximized, but in this case, pressure losses also increase. The outer tube surrounds the inner tube in the cascade tube and the upper part comes slightly above the surface of the liquid.

As FIGS. 3A and 3B also show, the cascade tubes 12 are advantageously located in the outer shell of the scrubber below the gas distribution chamber 15 and inside an outer chamber 20. After the cascade tube collision plate the gas flows upwards in the outer chamber around the cascade tube and at the same time the gas from each cascade tube comes together. In order to separate the droplets of water, which attached to the gas during scrubbing, from the gas it is beneficial to give the gas a whirling motion. For this purpose a chamber is formed in the scrubber, with a partition wall 21 such that at the bottom towards the outer chamber the partition is integral, but at the top annular chamber 22 is divided with tangentially placed partition walls 23 into segments 24. The number of segments is advantageously at the most half the number of cascade tubes. With the help of partitions 23 the gas, made a uniform flow in the outer chamber, is divided into sub-flows which are made to swirl with help of the partitions.

FIGS. 3A and 3B also show that progressing towards the centre of the scrubber, there is a further annular chamber 25 inside chamber 22 divided into segments. Here in chamber 25 belonging to the droplet separation unit, the separate gas flows coming from the segments 24 of the previous chamber are united again into a uniform tangential flow. Centrifugal force is obtained with the tangential flow, throwing the droplets of liquid contained in the gas against the walls of the chamber, where they flow to the scrubbing liquid in the bottom of the scrubber. The droplet separation capacity of the scrubber is improved when the apparatus comprises several chambers, where the gas is in a whirling motion and in which each subsequent chamber has a smaller cross-sectional area than the previous one.

In addition to gas flow-dividing chamber 22 and recombining chamber 25 the droplet separation unit comprises the droplet separation chamber 16 and the discharge tube 11 as well as a swirl cone 26. The swirl cone 26, which narrows towards the top, is located below the droplet separation chamber just above the surface of the liquid its task is to stabilize the gas vortex generated to the centre of the chamber and to prevent the vortex to suck up liquid from the liquid surface into the gas flow entering the droplet separation chamber. The whirling flow of the gas continues in the droplet separation chamber 16 and as a result, a pure, dropless gas is obtained, which is vented via the discharge tube 11. The magnitude of the centrifugal force depends on e.g. the tangential velocity of the gas, which can be adjusted according to the capacity using an adjustment element in inlet channel 9 (not shown in detail in the figure).

The essential difference between the scrubber shown in FIG. 3 and the one shown in FIG. 4 is that the size of the scrubber can be reduced by raising a lower edge 27 of the droplet separation chamber 16, so that the gas can still flow in the gas flow combining chamber 25, which has a smaller cross-sectional area than the previous scrubber.

In the embodiments presented in FIGS. 5A and 5B, in order to decrease the size of the scrubber, the cross-sectional area of the annular outer chamber 20 is reduced in the top of the chamber, because from there the gas can be made to flow to the next inner chamber. Thus the cross-sectional area of the outer chamber can be reduced. The cross-sectional area of the next inner chamber 22 in the direction of the flow has been reduced in the bottom of the chamber, because the separate gas flows flow mainly in the top of the chamber. A change in the cross-sectional area of the chambers is made by altering the construction of the partition 21 between the chambers.

The scrubber construction in FIG. 6 is the same type as the one shown in FIGS. 5A and 5B, but the lower edge 27 of the droplet separation chamber 16 has been further lowered so that the cover section of the scrubber is integral, apart from the discharge tube 11.

FIG. 7 shows a scrubber construction where the bottom 28 of the gas distribution chamber 15 has been inclined, so that the cross-sectional area of the distribution chamber reduces as the distance from the inlet channel increases. In this way the velocity of the discharging gas remains the same, although some of the gas is vented into the cascade tubes. The figure also shows that the liquid tank in the lower section of the scrubber can be divided into two parts so that the water used in gas scrubbing can be recovered separately and the droplet separation unit water recovered via a discharge channel 29.

FIGS. 8 and 9 are cross-sections of embodiments of the present invention, here the cascade tubes are located in the outer chamber in several shells. In the apparatus shown in FIG. 9 the outer tube 18 and collision plate 19 of the cascade tube are not circular in cross-section in order to save space. They have a segment missing, from the outer part of the tube and plate in the outer shell and from the inner part in the inner shell.

It is clear that within the sphere of the invention, the alternatives presented above may be modified as required. If for example the scrubber should be as small as possible in cross-section, but space is available in a vertical direction, the droplet separation unit can be arranged vertically without essentially changing the compact structure of the scrubber.

The benefits of the scrubber according to the invention over the prior art include an extremely simple construction, which is thus very easy to maintain as all scrubbing and droplet separation occurs essentially inside a cylindrical structure. Thanks to its cylindrical surfaces the scrubber construction is strong. This is important, because at times the scrubber is subject to a fair degree of reduced pressure, bringing ordinary scrubber dose to collapse. The scrubber according to the present invention is not sensitive to changes in capacity, because it is easy to shut off the desired quantity of scrubbing units, the cascade tubes, and the droplet separator can be adjusted according to the capacity by adjusting the cross-section of the inlet channel.

What is claimed is:

1. A cascade scrubber for scrubbing exhaust gas, whereby the scrubber contains several cascade tubes for scrubbing gas, an inlet channel for conveying the gas to the scrubber, a discharge tube for venting the gas from the scrubber and a liquid tank for scrubbing the gas, characterized in that a gas scrubbing unit and a droplet separation unit are combined in the scrubber into a compact apparatus, made up of several nested chambers, and that the cascade tubes are placed in an annular outer chamber surrounding said tubes, where the separate gas flows coming from each cascade tube are recombined.

2. A cascade scrubber according to claim 1, characterized in that a integrated gas distribution chamber is placed in the upper section of the scrubber, and is connected to cascade tubes in order to distribute the gas from the chamber to the cascade tubes.

3. A cascade scrubber according to claim 2, characterized in that the gas distribution chamber surrounds the gas discharge tube.

4. A cascade scrubber according to claim 2, characterized in that a bottom of the gas distribution chamber is inclined so that the cross-sectional area of the chamber reduces as the distance from the inlet channel increases.

5. A cascade scrubber according to claim 1, characterized in that the cross-sectional area of the upper section of the outer chamber is smaller than that of the lower section.

6. A cascade scrubber according to claim 1, characterized in that the outer chamber is connected to another annular chamber with the aid of at least partially tangentially positioned partitions.

7. A cascade scrubber according to claim 6, characterized in that the partitions divide said annular chamber into segments, the number of which is advantageously at most half the number of the cascade tubes.

8. A cascade scrubber according to claim 6, characterized in that the annular chamber containing the partitions is positioned inside the outer chamber.

9. A cascade scrubber according to claim 6, characterized in that the cross-sectional area of the upper section of the annular chamber is greater than that of the lower section of the chamber.

10. A cascade scrubber according to claim 6, characterized in that at least two more nested chambers forming the droplet separation unit of the scrubber are positioned inside the chamber containing tangential partitions.

11. A cascade scrubber according to claim 1, characterized in that the innermost chamber of the droplet separation unit is equipped at the liquid surface with a swirl cone narrowing towards the top.

12. A cascade scrubber according to claim 1, characterized in that the innermost chamber of the droplet separation unit is connected to the discharge tube of pure, dry gas.

13. A cascade scrubber according to claim 1, characterized in that the equipment functions in a reduced pressure.

14. A cascade scrubber according to claim 1, characterized in that the scrubber is essentially cylindrical at the gas scrubbing unit and droplet separation unit and conical at the lower section.

* * * * *